United States Patent
Coremans et al.

(10) Patent No.: US 10,456,732 B2
(45) Date of Patent: Oct. 29, 2019

(54) METHOD FOR CONTROLLING AN ADSORPTION PHASE OF A GAS GENERATOR AND A GAS GENERATOR APPLYING SUCH A METHOD

(71) Applicant: ATLAS COPCO AIRPOWER, NAAMLOZE VENNOOTSCHAP, Wilrijk (BE)

(72) Inventors: Tom Coremans, Wilrijk (BE); Joris Van Goethem, Wilrijk (BE); Frank Karel R. Van Puyenbroeck, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 148 days.

(21) Appl. No.: 15/735,674

(22) PCT Filed: May 31, 2016

(86) PCT No.: PCT/BE2016/000027
§ 371 (c)(1),
(2) Date: Dec. 12, 2017

(87) PCT Pub. No.: WO2016/197210
PCT Pub. Date: Dec. 15, 2016

(65) Prior Publication Data
US 2018/0361306 A1 Dec. 20, 2018

(30) Foreign Application Priority Data

May 2, 2016 (BE) .................................. 2016/5313

(51) Int. Cl.
*B01D 53/04* (2006.01)
*B01D 53/30* (2006.01)

(52) U.S. Cl.
CPC ......... *B01D 53/0454* (2013.01); *B01D 53/30* (2013.01); *B01D 2253/102* (2013.01);
(Continued)

(58) Field of Classification Search
CPC .. B01D 53/04; B01D 53/047; B01D 53/0454; B01D 53/30; B01D 2253/102;
(Continued)

(56) References Cited

U.S. PATENT DOCUMENTS

| 4,323,370 A | 4/1982 | Leitgeb |
| 4,648,888 A * | 3/1987 | Rowland ............... A61M 16/10 |
| | | 95/130 |

(Continued)

FOREIGN PATENT DOCUMENTS

| EP | 0129304 A2 | 12/1984 |
| EP | 0250235 A1 | 12/1987 |

(Continued)

OTHER PUBLICATIONS

International Search Report dated Oct. 7, 2016, for PCT/BE2016/000027.

*Primary Examiner* — Frank M Lawrence, Jr.
(74) *Attorney, Agent, or Firm* — Bacon & Thomas, PLLC

(57) ABSTRACT

A method for controlling an adsorption phase of a gas generator, said generator comprising an adsorbent medium capable of selectively adsorbing a first gaseous component from an inlet gas flow comprising a gaseous mixture, and allowing an outlet gas flow mainly comprising a second gaseous component, said method comprising: directing the inlet gas flow through an inlet of said gas generator; measuring the outlet gas flow; determining the concentration of said second gaseous component at the outlet of said vessel; wherein the method further comprises: calculating the capacity of the generator; comparing the measured outlet gas flow with the calculated capacity; maintaining the generator in adsorption phase for a predetermined time interval, $\Delta s$; subjecting the generator to a regenerating cycle after said predetermined time interval.

20 Claims, 4 Drawing Sheets

(52) U.S. Cl.
CPC .... *B01D 2253/116* (2013.01); *B01D 2256/10* (2013.01); *B01D 2257/104* (2013.01); *B01D 2259/4002* (2013.01); *B01D 2259/40003* (2013.01); *B01D 2259/40009* (2013.01); *B01D 2259/40052* (2013.01); *B01D 2259/40086* (2013.01)

(58) Field of Classification Search
CPC .......... B01D 2253/116; B01D 2256/10; B01D 2257/104; B01D 2259/40003; B01D 2259/40086
USPC ...... 95/8, 11, 23, 96, 148; 96/109, 111, 115, 96/121; 128/205.27
See application file for complete search history.

(56) References Cited

U.S. PATENT DOCUMENTS

| | | | |
|---|---|---|---|
| 7,789,939 B2* | 9/2010 | Blouin | G05B 13/024 95/23 |
| 2004/0244585 A1* | 12/2004 | Meckes | B01D 53/047 95/138 |
| 2013/0061747 A1* | 3/2013 | Turnbull | B01D 53/047 95/8 |

FOREIGN PATENT DOCUMENTS

| | | |
|---|---|---|
| JP | 2010-207750 A | 9/2010 |
| KR | 101349424 B1 | 1/2014 |
| WO | 2014/046297 A1 | 3/2014 |

* cited by examiner ic mixture is described. The process maintains the level of the residual concentration of the adsorbed component substantially constant by controlling the volume of the product gas stream withdrawn during the adsorption phase from an adsorber.
METHOD FOR CONTROLLING AN ADSORPTION PHASE OF A GAS GENERATOR AND A GAS GENERATOR APPLYING SUCH A METHOD This invention relates to a method for controlling an adsorption phase of a gas generator, said generator comprising an adsorbent medium capable of selectively adsorbing a first gaseous component from an inlet gas flow comprising a gaseous mixture, and allowing an outlet gas flow mainly comprising a second gaseous component, said method comprising the steps of: directing the inlet gas flow through an inlet of said gas generator; measuring the outlet gas flow; determining the concentration of said second gaseous component at the outlet of said vessel.

BACKGROUND OF THE INVENTION

Methods for maintaining a relatively constant concentration of a gaseous component generated from the fractionation of a gaseous mixture are known in the art.

One example can be found in U.S. Pat. No. 4,323,370 filed in the name of LINDE AKTIENGESELLSCHAFT, wherein a cyclic adsorption process for the fractionation of a gaseous mixture is described. The process maintains the level of the residual concentration of the adsorbed component substantially constant by controlling the volume of the product gas stream withdrawn during the adsorption phase from an adsorber.

One of the drawbacks of such a process is the amount of energy used for adsorption. Because, when the adsorption phase is increased, the productivity of a system implementing said process decreases. This happens because a bigger volume of gas will have to be processed and while one of the gaseous components is used after the adsorption process takes place, the other gaseous component is trapped within the adsorber, filling in a bigger volume of the vessel and eventually saturating the adsorber bed. This will make the device to consume more energy and eventually to provide a gaseous component of a lower concentration than needed.

Another drawback is the low efficiency of the adsorption process because the duration of the adsorption cycle is not correlated with the concentration requirements for the gaseous component.

An identified risk is the possibility of facing a lower than requested concentration of the gaseous component, and the above mentioned document does not offer an immediate remedy, fact that can jeopardize the user's process or network.

Taking the above mentioned drawbacks and risks into account, it is an object of the present invention to provide a method for controlling an adsorption phase of a gas generator, during which the concentration of a gaseous component is maintained at the desired level, while at the same time, the energy consumption of the adsorption process is decreased.

It is another object of the present invention to maintain the increased energy efficiency during a varied demand of said gaseous component.

It is another object of the present invention to provide a method that helps in maintaining a high level of energy efficiency during subsequent adsorbing cycles.

Yet another object of the present invention is to provide a method that would ultimately reduce the maintenance costs of the overall system.

SUMMARY OF THE INVENTION

The present invention solves at least one of the above and/or other problems by providing a method for controlling an adsorption phase of a gas generator, said generator comprising an adsorbent medium capable of selectively adsorbing a first gaseous component from an inlet gas flow comprising a gaseous mixture, and allowing an outlet gas flow mainly comprising a second gaseous component, said method comprising the steps of:
  directing the inlet gas flow through an inlet of said gas generator;
  measuring the outlet gas flow;
  determining the concentration of said second gaseous component at the outlet of said vessel;
  wherein the method further comprises the steps of:
    A1) calculating the capacity of the generator;
    A2) comparing the measured outlet gas flow with the calculated capacity;
    A3) if the measured outlet gas flow is lower than the calculated capacity, and if the determined concentration is higher than or equal to a set value, maintaining the generator in adsorption phase for a predetermined time interval, $\Delta s$;
    A4) subjecting the generator to a regenerating cycle after said predetermined time interval, $\Delta s$.

Indeed, by comparing the calculated capacity of the generator with the measured outlet flow and also comparing the determined concentration with a set value, the method according to the present invention provides an accurate view regarding the condition of the vessel at a certain moment and maintains the desired level of concentration for the second gaseous component at the outlet of the generator.

Moreover, because the method takes into account the measured value of the outlet flow and the capacity of the generator, the saturation of the adsorbent medium is avoided, allowing the generator to work at high efficiency and to maintain the required concentration of the second gaseous component throughout the duration of the adsorption process.

Tests have shown that the efficiency of the adsorption process decreases if the time interval for the adsorption cycle is prolonged. As such, when the adsorption cycle is maintained for a relatively long period of time, a bigger volume of gas will enter within the generator and an increasing number of oxygen molecules will have to be adsorbed by the adsorbent.

As a consequence, the oxygen front created in the adsorbent bed will move towards the outlet of the gas generator. Because of this, the concentration level of the second gaseous component can be affected at the outlet. In such a case, the productivity of the gas generator drops and the reliability of the adsorption process decreases.

Because the method of the present invention not only compares the concentration of the second gaseous component at the outlet of the gas generator with a set value, but also compares the calculated generator capacity with the outlet flow before modifying the time interval in which the generator is maintained in adsorption phase, the desired concentration for the second gaseous component is assured and also, an optimal energy consumption is achieved throughout the complete functioning of the gas generator.

Another known fact is that gas generators are designed to operate in the most severe and harsh operating conditions when parameters like temperature and pressure are discussed. And, when such parameters are fluctuating because of for example the change of seasons or the usage of the generator in another geographical area, the generator becomes oversized. Known generators would not be able to solve such an issue, but the method according to the present invention allows an energy efficient usage of the generator irrespective of these fluctuations.

In fact, test have shown that by implementing the method according to the present invention, the generator consumes with up to 40% less energy.

Another known fact is that, within a typical production line, the desired concentration and the volume of the second gaseous component is typically fluctuating, and the method according to the present invention maintains the generator in adsorption phase for a predetermined time interval which is determined based on the desired concentration and volume. Accordingly, an adjustment of the functioning capabilities of the gas generator are performed, in order to achieve a lower energy consumption through an efficient logic.

Preferably, after said predetermined time interval, the generator is subjected to a regenerating cycle, during which the molecules of the first gaseous component are removed from the generator and the adsorbent bed is brought to an initial stage, with nominal adsorbent characteristics.

In a preferred embodiment according to the present invention the method further comprises the step of comparing the determined concentration with a set value and if said concentration is below the set value, interrupting the inlet gas flow and subjecting the generator to a regenerating cycle. Because of this, the required concentration of the second gaseous component is maintained at the desired level.

The interruption of the inlet gas flow can be performed immediately after the comparison between the determined concentration and the set value reveals a negative result, or the method according to the present invention can interrupt the inlet gas after a nominal predetermined cycle time, $\Delta s_0$, calculated from the beginning of the adsorption cycle.

The present invention is further directed to a gas generator comprising:
  at least one vessel, comprising: an inlet and an outlet for allowing a flow of gas therethrough and an adsorbent material capable of selectively adsorbing a first gaseous component form a gaseous mixture and allowing an outlet gas flow mainly comprising a second gaseous component to flow through said outlet;
  means for providing an inlet gas flow at the inlet of said vessel;
  wherein the device further comprises:
  a flow meter positioned at the outlet of the vessel for measuring the outlet gas flow;
  means for determining the concentration of said second gaseous component, positioned at the outlet of the vessel;
  a controller unit connected to the flow meter and to the means for determining the concentration of said second gaseous component, said controller being configured to receive measured values of the outlet gas flow and of the measured concentration;
  said controller unit further comprises a processing unit being provided with an algorithm configured to:
    calculate the capacity of the vessel,
    compare the measured outlet gas flow with the calculated capacity,
    compare the determined concentration of said second gaseous component with a set value, and:
    A. said controller unit being further programmed to maintain the inlet gas flow for a predetermined time interval, $\Delta s$, when said measured concentration is equal to or higher than a set value, and when said measured outlet gas flow is lower than the calculated capacity.

Because of the capabilities of the controller unit, the user of such a device would have the best result with a decreased energy consumption and will benefit from a user friendly interface.

Moreover, because the device is controlled by said controller unit, and because the above specified logic is applied, the maintenance costs are reduced, since the component parts of the device are protected from functioning in limit conditions which would cause a premature wear. The controller unit helps in applying all the changes at the best calculated time in accordance with the design of the device, such that the life span of the device is prolonged.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
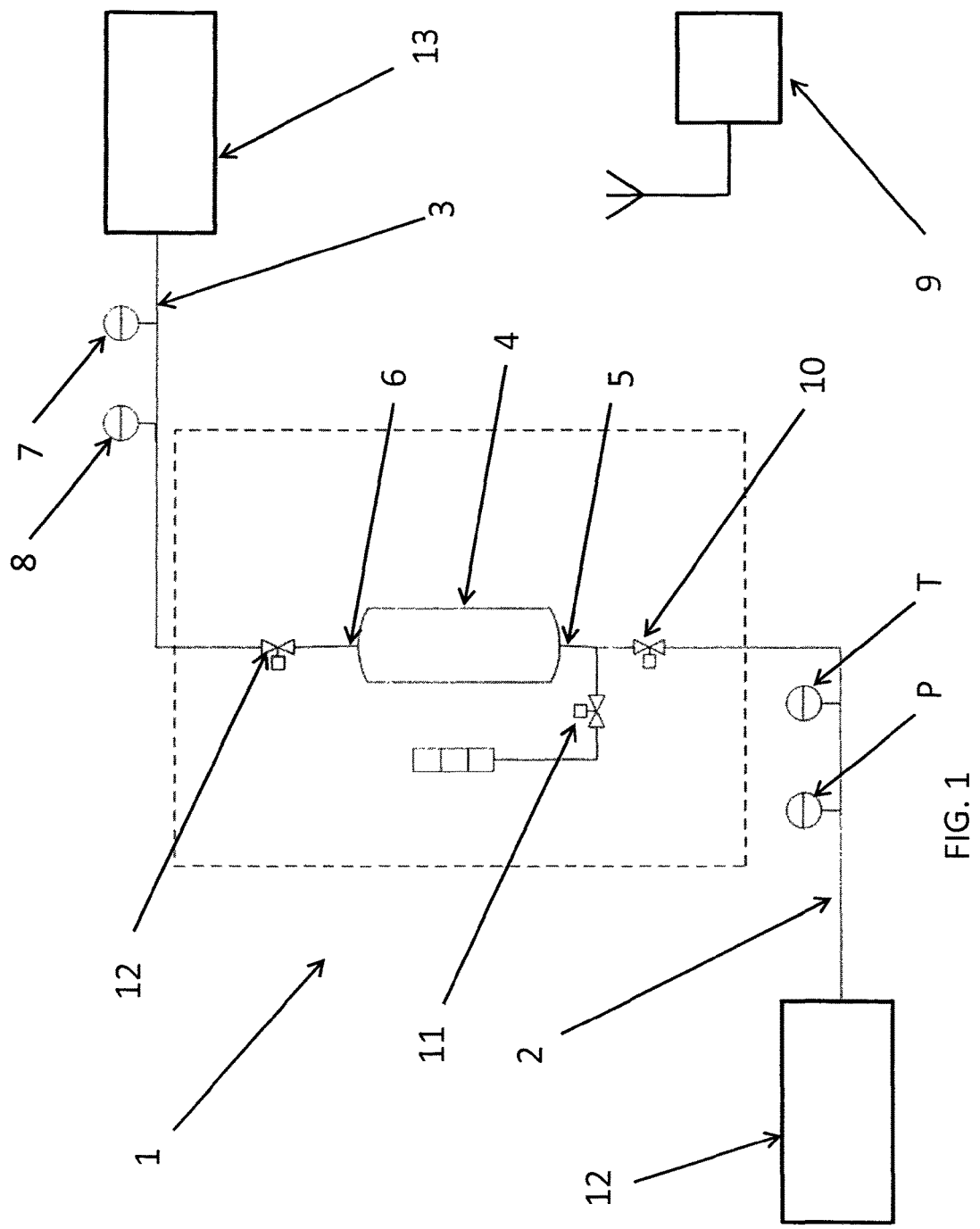
FIG. 1 schematically represents a gas generator according to an embodiment of the present invention.

FIG. 1 shows a gas generator 1 comprising and inlet 2 and an outlet 3, for allowing a flow of gas therethrough. Said gas generator further comprises an adsorbent medium (not shown) capable of selectively adsorbing a first gaseous component from an inlet gas flow comprising a gaseous mixture, and allowing an outlet gas flow mainly comprising a second gaseous component.

In the context of the present invention it should be understood that adsorption also includes absorption.

The present invention is directed to a method for controlling an adsorption phase of a gas generator, wherein an inlet gas flow is directed through said inlet 2 of the gas generator 1, and the outlet gas flow at the outlet 3 of the gas generator 1 is measured in order to determine the concentration of said second gaseous component at the outlet of a vessel 4.

Further, the method comprises a step in which the capacity of the generator is calculated and the calculated value is compared with the measured outlet flow.

If, after said comparison, the measured outlet flow is lower than the calculated capacity, and if the determined concentration is higher than or equal to a set value, the gas generator 1 is maintained in adsorption phase for a predetermined time interval, $\Delta s$.

In the context of the present invention the capacity of the generator should be understood as the maximum volume of the second gaseous component per unit of time that can be delivered by the gas generator 1 at the current operating conditions and at the set value of the concentration.

Further, the outlet flow should be understood as the measured volume of the second gaseous component per unit of time.

Preferably, said predetermined time interval, $\Delta s$ is calculated such that said set value of the concentration can be maintained by the gas generator 1 and, accordingly, such that the adsorbent medium is not becoming fully saturated. Because of this, the gas generator 1 is maintained in adsorption phase for as long as possible, without jeopardizing the concentration level of the resulting second gaseous component and without allowing said gas generator 1 to consume more energy than needed for an optimal result.

After said predetermined time interval, Δs, the gas generator is subjected to a regenerating cycle. During said regenerating cycle, the adsorbent medium is allowed to eliminate the gas molecules of the first gaseous component, which brings said adsorbent to optimal adsorption capabilities and prepares the gas generator 1 for another adsorption cycle.

In the context of the present invention an adsorption cycle should be understood as a time interval in which the adsorbent medium comprised within the gas generator 1 is used for fractionating the gaseous mixture of the inlet gas flowing through the inlet 2, and accordingly, adsorbs the first gaseous component and allows a gas comprising mainly a second gaseous component to flow through the outlet 3.

Preferably said predetermined time interval Δs has the starting point as the moment when the gas generator 1 started the adsorption cycle and the end point when said gas generator 1 ended the adsorption cycle.

In another embodiment according to the present invention, said predetermined time interval Δs has the starting point at the current moment and an end point in the future and determined based on the calculated capacity the measured outlet floe and the set value of the concentration of said second gaseous component. Based on the typical behavior of the adsorbent medium, such end time can be approximated.

In another embodiment according to the present invention, the method further comprises the step of comparing the determined concentration with a set value and if said concentration is below the set value, interrupting the inlet gas flow and subjecting the generator to a regenerating cycle.

The inlet gas flow can be interrupted immediately when said comparison reveals that the set value of the concentration is not met, or the method can consider a tolerance of for example approximately 5 seconds or more before interrupting the inlet gas flow.

Preferably, the method comprises the step of interrupting the inlet gas flow after a nominal predetermined cycle time, $\Delta s_0$. Said nominal predetermined cycle time, $\Delta s_0$ is a calculated minimum time interval in which, under commonly known functioning conditions, the gas generator 1 can generate the second gaseous component with a relatively high concentration.

Said nominal predetermined cycle time, $\Delta s_0$ has a starting point the moment when the gas generator 1 started the adsorption cycle and the end point the moment when the gas generator 1 ended the adsorption cycle.

Preferably, the capacity of the generator is determined based on the following formula:

$$Q\text{cap} = \text{Specific capacity} \times \text{Generator volume} \times Kpc \times Ktc$$

whereby, $Kpc$ is the pressure correction factor for capacity and $Ktc$ is the temperature correction factor for capacity.

In the context of the present invention, said Specific capacity should be understood as the capacity of the gas generator 1 per cubic meter of adsorbent medium and at nominal conditions of pressure and temperature, like for example and not limiting to: a pressure of approximately 7 bar and a temperature of approximately 20° C.

$Kpc$ and $Ktc$ are two correction factors that depend on the set value of the second gaseous component and of the actual temperature or pressure, respectively, measured at the level of the generator.

Preferably, said temperature is measured with the help of a temperature sensor T, and the pressure is measure with the help of a pressure sensor P.

Preferably, the method according to the present invention further comprises the step of comparing the amount of time that the generator is in adsorption phase, $\Delta t1$, with a minimum set time interval, $\Delta t2$.

Wherein $\Delta t1$ is a counter that preferably starts when the gas generator 1 starts an adsorption cycle and is defined by $\Delta t1 = tc - ti$, wherein tc is the current time and ti is the initial time.

Preferably, the method comprises the step of resetting the counter when the gas generator 1 starts an adsorption cycle. More specifically, the method preferably comprises the step of resetting the values of both tc and ti when the gas generator 1 starts an adsorption cycle.

$\Delta t2$ is a counter that preferably starts when the gas generator 1 starts an adsorption cycle and is defined by $\Delta t2 = td - ti$, wherein td is the minimum amount of time in which the gas generator is maintained in the adsorption cycle no matter of the values of the other parameters and ti is the initial time when the gas generator 1 starts an adsorption cycle.

Preferably, the method comprises the step of resetting the counter when the gas generator 1 starts an adsorption cycle. More specifically, the method preferably comprises the step of resetting the value of ti when the gas generator 1 starts an adsorption cycle and preferably maintains the value of td constant.

After comparing $\Delta t1$ with $\Delta t2$, the method comprises the step of either maintaining the gas generator 1 in adsorption phase for said predetermined time interval, $\Delta s$ if $\Delta t1 > \Delta t2$ and if the determined concentration is higher than or equal to said set value and if the measured outlet flow is lower than the calculated capacity; or maintaining the gas generator 1 in adsorption phase during the nominal predetermined cycle time, $\Delta s_0$, and afterwards is subjected to a regenerating cycle if $\Delta t1 <= \Delta t2$ or if the determined concentration is lower than said set value and if the measured outlet flow is lower than the calculated capacity.

Preferably, but not limiting to, the first gaseous component is oxygen and the second gaseous component is nitrogen.

The method according to the present invention further comprises the step of directing the inlet gas flow through the inlet 5 of at least one vessel 4, part of the generator 1.

Figure 2:
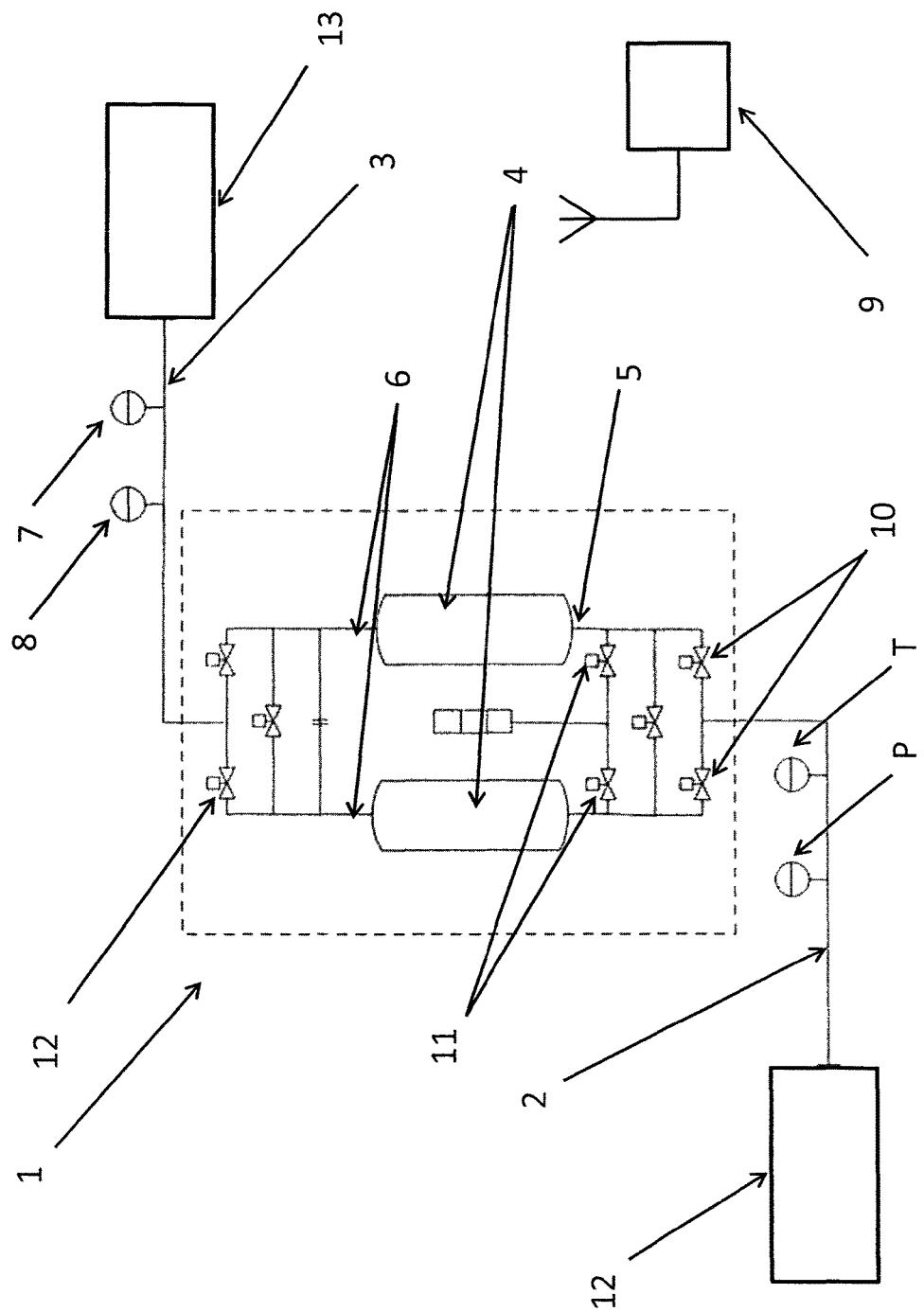
FIGS. 2 and 3 schematically represents a gas generator according to other embodiments of the present invention.

Preferably, the method further comprises alternatively directing the inlet gas flow through the inlet 5 of at least two vessels 4 (FIG. 2), or through at least four vessels 4 (FIG. 3), or more.

Because the method comprises the step of alternatively directing the inlet gas flow through the inlet 5 of two vessels 4 or of four vessels 4 or more, the efficiency of the adsorption process increases because, as soon as one vessel 4 is subjected to a regeneration cycle, another vessel 4 can be used, without interrupting the generation of the second gaseous component at the outlet 3 of the gas generator 1.

In another embodiment, when one vessel 4 is subjected to a regeneration cycle, the outlet gas flow from one vessel 4 is directed to the inlet 5 of at least another vessel 4. Because of this, the vessel 4 being in regeneration phase will receive a gaseous mixture at its outlet 6 which will comprise a relatively high concentration of the second gaseous component, said gaseous mixture will push the gaseous content of the vessel being regenerated towards the inlet, and further to the outside environment though a valve 11 or a tap or the like positioned at the inlet 5 of the vessel 4. This allows said vessel 4 to be regenerated in a shorted period of time and better prepares it for the next adsorption cycle.

Another possible step performed by the method according to the present invention is comparing the outlet flow with the calculated capacity and maintaining the inlet flow for a predetermined time interval if the outlet flow is higher than a first threshold when compared with the calculated capacity. Because of this, an optimal functioning of the gas generator 1 is applied, reducing even more the energy consumption.

Preferably, but not limiting to, the method uses at least one threshold, and further comprises at least one of the following steps:

maintaining the inlet gas flow for a predetermined nominal time interval, $\Delta s0$, if the measured outlet flow is higher than a first threshold when compared with the calculated capacity; or maintaining the inlet gas flow for a predetermined first time interval, $\Delta s1$, if the measured outlet flow is lower than said first threshold when compared with the calculated capacity.

Preferably but not limiting to, the method uses one or more set thresholds, and further comprises at least one of the following steps:

maintaining the inlet gas flow for a predetermined nominal time interval, $\Delta s_0$, if the measured outlet flow is higher than a first threshold when compared with the calculated capacity; or maintaining the inlet gas flow for a predetermined first time interval, $\Delta s_1$, if the measured outlet flow is lower than said first threshold when compared with the calculated capacity; or maintaining the inlet gas flow for a predetermined second time interval, $\Delta s_2$, if the measured outlet flow is lower than a second threshold when compared with the calculated capacity; or maintaining the inlet gas flow for a predetermined third time interval, $\Delta s_3$, if the measured outlet flow is lower than a third threshold when compared with the calculated capacity.

By applying the logic as described above, the efficiency of the system is even more increased.

Preferably, two or more of the time intervals described above are of a different length when compared to each other.

Preferably but not limiting to, said nominal time interval, $\Delta s0$, can be a value selected within the interval: 15 and 65 seconds, or between 20 and 65 seconds, or between 20 and 45 seconds.

Preferably but not limiting to, said predetermined first time interval, $\Delta s1$, can be a value selected within the interval: 45 and 85 seconds, or 45 and 60 seconds.

Preferably but not limiting to, said predetermined second time interval, $\Delta s2$, can be a value selected within the interval: 60 and 120 seconds, or 60 and 80 seconds.

Preferably, but not limiting to, said predetermined third time interval, $\Delta s3$, can be a value selected within the interval: 80 and 300 seconds, or 80 and 180 seconds.

In the context of the present invention it is to be understood that the above defined time intervals are only examples and other values can be used as well.

Preferably, but not limiting to, said first threshold can be selected at approximately 80%, said second threshold can be selected at approximately 60%, and said third threshold can be selected at approximately 40%.

In the context of the present invention it is to be understood that the above defined thresholds are only examples and other values can be used as well.

In another embodiment according to the present invention the method further comprises at least one of the following steps:

maintaining the inlet gas flow for a predetermined nominal time interval, $\Delta p_0$, if the measured outlet flow is higher or equal to a first threshold when compared with the calculated capacity; or maintaining the inlet gas flow for a predetermined first time interval, $\Delta p_1$, if the measured outlet flow is lower than said first threshold when compared with the calculated capacity; or maintaining the inlet gas flow for a predetermined second time interval, $\Delta p_2$, if the measured outlet flow is lower than a second threshold when compared with the calculated capacity; or maintaining the inlet gas flow for a predetermined third time interval, $\Delta p_3$, if the measured outlet flow is lower than a third threshold when compared with the calculated capacity; or maintaining the inlet gas flow for a predetermined fourth time interval, $Lp_4$, interval if the measured outlet flow is lower than a fourth threshold when compared to the calculated capacity; or maintaining the inlet gas flow for a predetermined fifth time interval, $\Delta p_5$, if the measured outlet flow is lower than fifth threshold when compared to the calculated capacity; or maintaining the inlet gas flow for a predetermined sixth time interval, $\Delta p_6$, if the measured outlet flow is lower than a sixth threshold when compared to the calculated capacity; or maintaining the inlet gas flow for a predetermined seventh time interval, $\Delta p_7$, if the measured outlet flow is lower than a seventh threshold when compared to the calculated capacity; or maintaining the inlet gas flow for a predetermined eight time interval, $\Delta p_8$, if the measured outlet flow is lower than an eighth threshold when compared to the calculated capacity; or maintaining the inlet gas flow for a predetermined ninth time interval, $\Delta p_9$, if the measured outlet flow is lower than a ninth threshold when compared to the calculated capacity.

Preferably, two or more of the time intervals described above are of a different length when compared to each other.

Preferably, two or more of the time intervals: $\Delta s0$, $\Delta s1$, $\Delta s2$, $\Delta s3$ and $\Delta p1$, $\Delta p2$, $\Delta p3$, $\Delta p4$, $\Delta p5$, $\Delta p6$, $\Delta p7$, $\Delta p8$, $\Delta p9$, $\Delta p10$ are of a different length when compared to each other, such that depending on the outlet flow and the calculated capacity, the adsorbent medium will allow the generator to work in optimal conditions for a different amount of time, depending on the reached or not reached threshold.

Preferably but not limiting to, said predetermined nominal time interval, $\Delta p0$, can be a value selected within the interval: 15 and 50 seconds; said predetermined first time interval, $\Delta p1$, can be a value selected within the interval: 30 and 60 seconds; predetermined second time interval, $\Delta p2$, can be a value selected within the interval: 40 and 70 seconds; said predetermined third time interval, $\Delta p3$, can be a value selected within the interval: 50 and 80; said predetermined fourth time interval, $\Delta p4$, can be a value selected within the interval: 60 and 90 seconds; said predetermined fifth time interval, $\Delta p5$, can be a value selected within the interval: 70 and 100 seconds; said predetermined sixth time interval, $\Delta p6$, can be a value selected within the interval: 80 and 130 seconds; said predetermined seventh time interval, $\Delta p7$, can be a value selected within the interval: 90 and 150 seconds; said predetermined eight time interval, $\Delta p8$, can be a value selected within the interval: 100 and 200 seconds; and said predetermined ninth time interval, $\Delta p9$, can be a value selected within the interval: 110 and 300 seconds.

In the context of the present invention it is to be understood that the above defined time intervals are only examples and other values can be used as well.

Preferably, said thresholds and the time intervals are calculated based on the type and size of the generator 1 and the type and volume of the adsorbent medium.

Preferably, but not limiting to, said first threshold can be selected at approximately 90%, said second threshold can be selected at approximately 80%, said third threshold can be selected at approximately 70%, said fourth threshold can be selected at approximately 60%, said fifth threshold can be selected at approximately 50%, said sixth threshold can be selected at approximately 40%, said seventh threshold can be selected at approximately 30%, said eight threshold can be selected at approximately 20%, and said ninth threshold can be selected at approximately 10%.

In the context of the present invention it is to be understood that the above defined thresholds are only examples and other values can be used as well.

Because the method applies such steps, an accurate and fast adaptation of the generation of said second gaseous component is performed, based on the demand at the outlet 3, and the risk of the gas generator 1 to be oversized or undersized for the demand is eliminated. Accordingly, the gas generator will work at optimal parameters throughout the entire functioning range. Another encountered benefit is the reduced volume of inlet gas flow.

In the context of the present invention it is to be understood that the number of intervals can vary from for example two to twenty or even more, depending on the capabilities of the gas generator and of the desired results.

Figure 4:
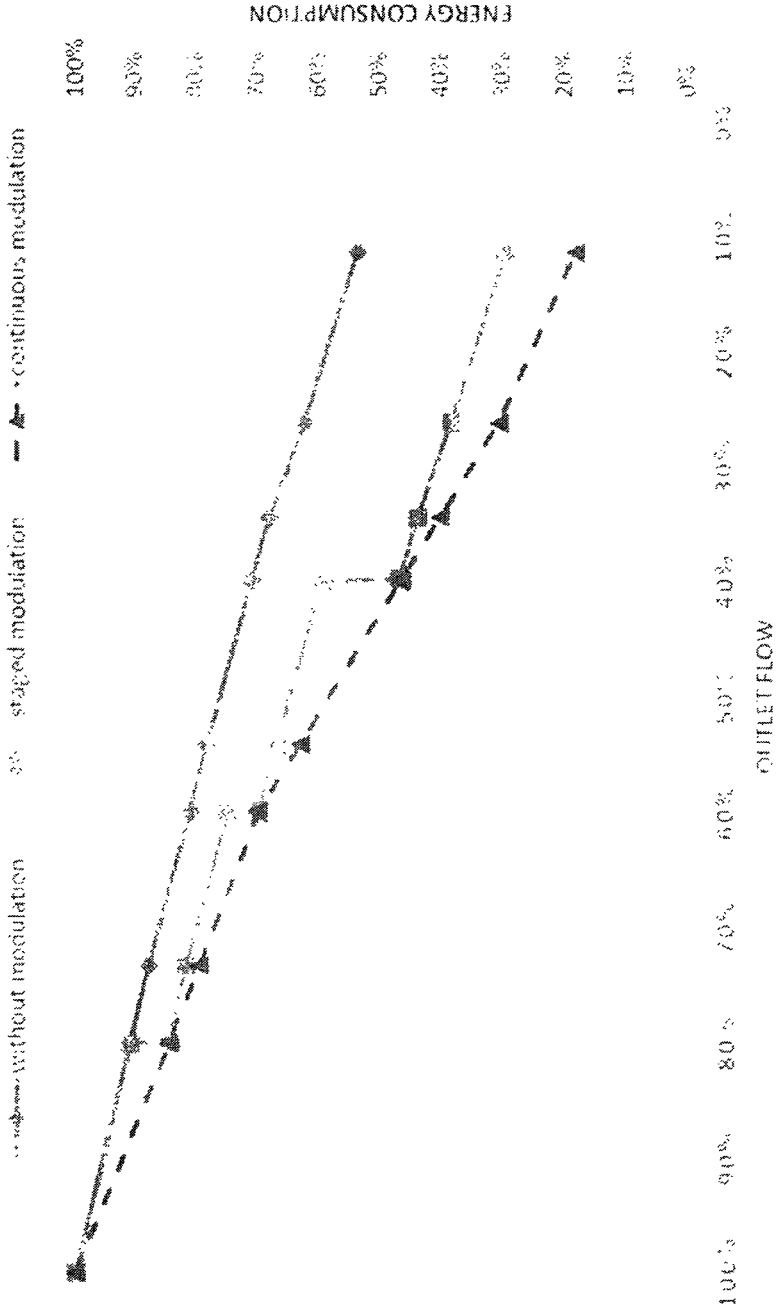
FIG. 4 schematically represents the energy consumption as a function of the outlet flow.

In another embodiment according to the present invention, the method can be applied in a continuous manner, wherein the cycle times are interpolated continuously between defined set points. Because of this, an even bigger energy consumption can be measured (FIG. 4).

In yet another embodiment according to the present invention, the method can further comprise the step of maintaining one vessel 4 in regenerating cycle during a time interval that depends on the length of the time interval in which said vessel was maintained in an adsorption cycle and/or on the set value of concentration for the second gaseous component.

As an example, but not limiting to, when the time interval in which a vessel 4 is maintained in an adsorption cycle is prolonged, preferably, the time interval in which said vessel 4 is maintained in regeneration cycle is also prolonged.

Typically, but not limiting to, the nominal time interval in which a vessel 4 is maintained in a regeneration cycle can be of approximately 30 seconds, and such time interval can be prolonged until approximately 60 seconds or more.

Preferably, said regeneration cycle can be performed through a fixed flow valve or a fixed restrictor such as a nozzle or orifice, or an open/close valve, or said regeneration cycle can be performed with the help of a flow controller capable of regulating the volume of gas eliminated therethrough.

Because, during the regeneration cycle, both the first gaseous component and the second gaseous component are being evacuated from the vessel 4, by prolonging the time interval in which the regeneration cycle is maintained, a bigger volume of gas comprising the second gaseous component in high concentration can be eliminated from said vessel 4. However, if a flow controller or an open/close valve to regulate the time and thus the total volume of regeneration gas is used, said volume is reduced to a minimum and the vessel 4 is prepared for the next adsorption cycle in an efficient way.

The present invention is further directed to a gas generator 1 comprising at least one vessel 4 (FIG. 1), said vessel 4 having an inlet 5 and an outlet 6.

The gas generator is allowing a gas mixture to flow through said inlet 5 and by using an adsorbent material (not shown), entraps a first gaseous component therein and allows a gas flow mainly comprising a second gaseous component to flow through said outlet 6.

The gas generator 1 further comprises a flow meter 7 positioned at the outlet 6 of the vessel for measuring the volume of the second gaseous component leaving the vessel 4, per unit of time.

The gas generator 1 further comprises a module 8 for determining the concentration of said second gaseous component, said module being also positioned at the outlet 6 of the vessel 4.

Preferably, but not limiting to, said module 8 is measuring the concentration of the first gaseous component from the outlet gas flow and determines the concentration of the second gaseous component by deducting the measured value from 100.

In a preferred embodiment according to the present invention said first gaseous component is oxygen and said second gaseous component is nitrogen.

Preferably, but not limiting to, said module 8 is an oxygen level transmitter, detecting the amount of oxygen in the gas flowing at the outlet 6 of a vessel 4. Said oxygen level transmitter can measure the concentration of oxygen from the outlet gas flow in a continuous manner or with a certain sampling rate.

Preferably, said module 8 makes part of the gas generator 1.

The gas generator 1 further comprises a controller unit 9 connected through a wired or wireless connection to the flow meter 7 and to the module 8 for determining the concentration of said second gaseous component, said controller being configured to receive measured values of the outlet gas flow and of the measured concentration.

The controller unit 9 can further comprise a storage unit for storing said received measured values or can send through a wired or wireless connection such values to an external electronic module.

Said wireless connection can be performed through a radio signal or a Wi-Fi signal. Preferably, the gas generator 1 comprises a wireless receiver (not shown) for allowing the communication to take place.

For clarity's sake, the wired connections have not been included in the drawings.

Further, said controller can receive said measurements immediately as they are being made or within a certain time interval. It can also receive all the values of the measurements or can receive only one measurement taken after a certain time interval.

Furthermore, said measurements can be performed continuously or with a certain sampling rate.

Preferably, said controller unit 9 further comprises a processing unit being provided with an algorithm configured to: calculate the capacity of the vessel 4, compare the measured outlet gas flow with the calculated capacity, and compare the determined concentration of said second gaseous component with a set value.

Said capacity of the vessel 4 should be understood as the maximum volume of the second gaseous component per unit of time that can be delivered at the outlet 6, at the current operating conditions and at the set value of concentration for the second gaseous component.

In another preferred embodiment, the time intervals and thresholds as previously defined in the present paper are being stored within the storage unit. Preferably, such time intervals and thresholds are being defined previous to the functioning of said gas generator 1.

Preferably, said controller unit 9 is being further programmed to maintain the inlet gas flow for a predetermined time interval, $\Delta s$, when said measured concentration is equal to or higher than a set value, and when said measured outlet gas flow is lower than the calculated capacity.

In another preferred embodiment according to the present invention, the controller unit 9 is further programmed to maintain the inlet gas flow at the inlet 5 of the vessel 4 for a predetermined nominal cycle time interval, $\Delta s_0$, and to stop the inlet gas flow after said predetermined nominal cycle time interval, $\Delta s_0$, when said measured concentration is lower than the set value.

For preparing the vessel 4 for another adsorption cycle, the controller unit 9 is further programmed to apply a regenerating cycle to said vessel 4 after said predetermined time interval, $\Delta s$, or after said nominal cycle time interval, $\Delta s0$, respectively.

For an increased efficiency of the adsorption process, the gas generator 1 according to the present invention preferably comprises at least two vessels 4, each of said vessels comprising an inlet 5 and an outlet 6 for allowing a flow of gas therethough, and an adsorbent material (not shown), capable of selectively adsorbing a first gaseous component form a gaseous mixture and allowing an outlet gas flow mainly comprising a second gaseous component to flow through said outlet 6.

In a preferred embodiment according to the present invention each of said vessel 4 comprises a flow meter 7 and a module 8 for determining the concentration of the second gaseous component, positioned at the outlet 6 of each vessel.

In another embodiment according to the present invention, the outlets 6 of all vessels connect to form a common outlet, and said common outlet further comprises a flow meter 7 and a module 8 for determining the concentration of the second gaseous component.

Preferably, said controller unit 9 is further programmed to selectively provide said inlet gas flow through the inlet 5 of either one of the at least two vessels 4.

In another preferred embodiment, the vessel 4 further comprises a valve 10 at the inlet 5 for allowing said inlet gas flow to reach the adsorbent medium of said vessel 4.

Preferably, each of said vessel 4 comprises a valve 10 for allowing the inlet gas flow to reach the adsorbent medium.

Preferably, said controller unit 9 is programmed to open and to close each of said valve 10 whenever the inlet gas flow needs to reach the adsorbent medium of one of said vessels 4.

Preferably, but not limiting to, the controller unit 9 is programmed to open said valves 10 such that only one vessel 4 is in adsorption phase at one time.

Preferably, the controller unit 9 opens the outlet valve 12 simultaneously with the valve 10 of each respective vessel.

The controller unit 9 preferably recalculates the specific capacity of the generator 1 based on the temperature and pressure measurements performed with the temperature sensor T and pressure sensor P.

The gas generator 1 according to the present invention can further comprise a branch-off connection 11 for allowing each of the at least two vessels 4 to be vented to the outside environment.

Preferably said branch-off connection 11 can be in the shape of a valve or of a tap or the like.

Figure 3:
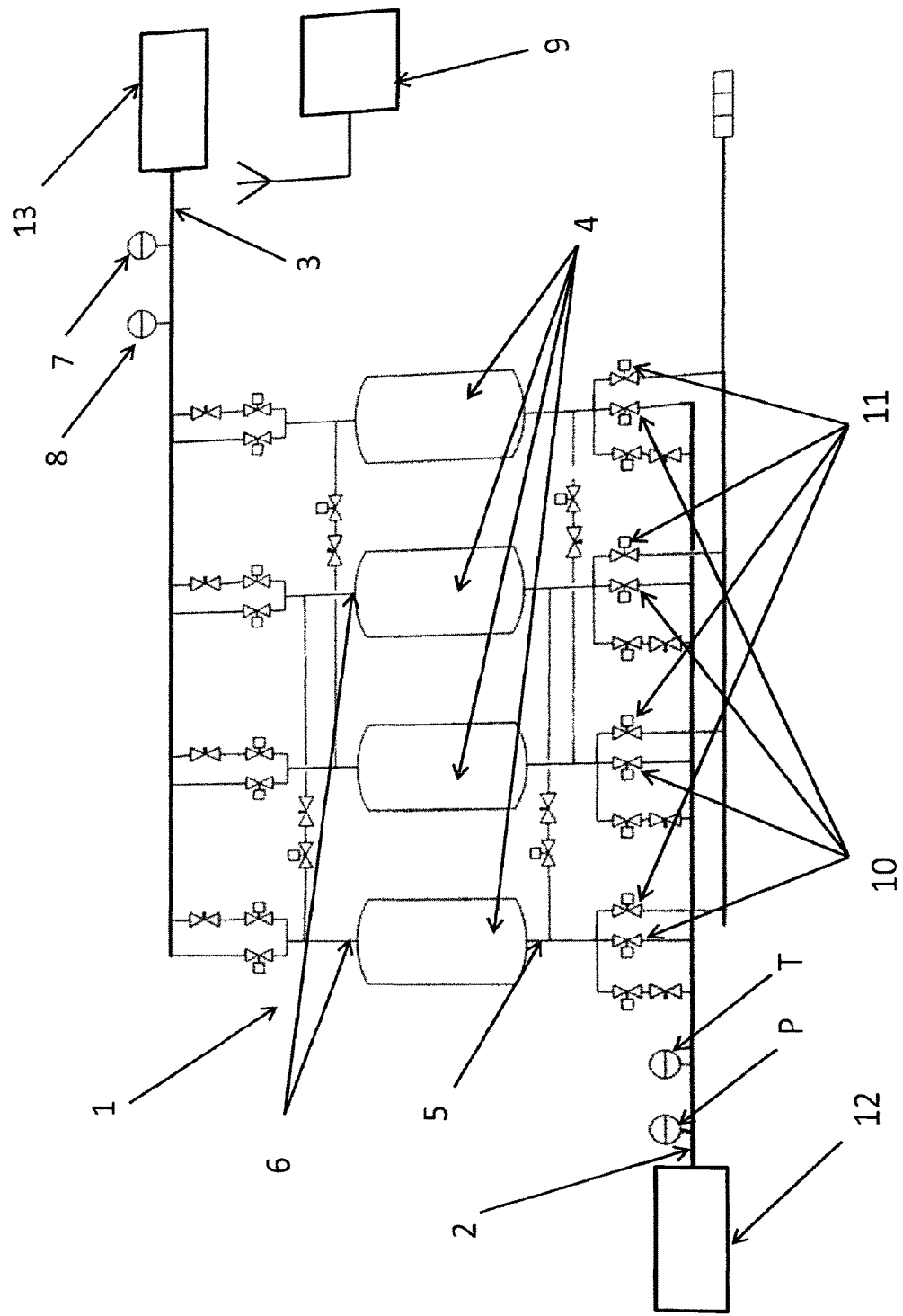

Preferably, the controller unit 9 is further programmed to start a regeneration cycle for one of the at least two adsorption vessels 4 and to selectively direct the inlet gas flow through one of the other at least two regenerating vessels 4 (FIG. 3). Preferably this is done with the help of valve 10, positioned at the inlet of the vessel 4.

In another embodiment according to the present invention the controller unit 9 is further programmed to measure a time interval, $\Delta t1$, in which one of the at least two vessels 4 is in adsorption phase and to compare the measured time interval with a minimum set time interval, $\Delta t2$, and:
  if $\Delta t1 > \Delta t2$ and if the measured concentration is equal to or higher than a set value, and when said measured outlet flow is lower than the calculated capacity, then the controller unit 9 maintains the inlet gas flow for said predetermined time interval, $\Delta s$; or
  if $\Delta t1 <= \Delta t2$ and if the measured concentration is equal to or higher than a set value, and when said measured outlet flow is lower than the calculated capacity, then the controller unit 9 maintains the inlet gas for said predetermined nominal cycle time interval, $\Delta s_0$.

Preferably, but not limiting to, each of the at least two vessels 4 comprises and adsorbent medium comprising carbon molecular sieves.

In another preferred embodiment, said inlet gas flow can be provided from an outlet of a compressor unit 12' and the outlet gas flow can be directed to a user's network 13.

Preferably, but not limiting to, said outlet gas flow reaches a nitrogen receiver (not shown) before it is directed to said user's network 13.

In another embodiment according to the present invention, the concentration of said second gaseous component is determined after said nitrogen receiver and before the user's network 13.

If the determined concentration is lower than the set value, the nitrogen receiver is preferably subjected to a flush cycle. During such flush cycle, the gaseous mixture present within the nitrogen receiver is allowed to reach the outside environment. Preferably said flush cycle is performed by opening a valve positioned at the outlet of the nitrogen receiver.

In another preferred embodiment according to the present invention, the gas generator 1 further comprises a user interface (not shown) preferably connected to the controller unit 9.

By using said user interface, a user of a gas generator 1 according to the present invention can select different parameters such that the outlet gas flow will correspond with the requirements of his network, such as a parameter selected from a group comprising: said set value of concentration of the second gaseous component, the energy consumption of the gas generator, the usage of a compressor unit or of another generator of an inlet gas flow, the type of adsorption medium used, the number of vessels to be used, or any combinations thereof.

Said user interface can be in the shape of a touch screen comprising different selections, or in the shape of potentiometers allowing a user to make different selections, or in the shape of manually actuated connections such as valves or levers allowing a user to configure the gas generator 1 according to his need.

Said user interface can for integral part of the gas generator 1 or can form part of an external electronic module, communicating with said gas generator 1 through a wired or wireless connection.

The present invention is further directed to a controller unit comprising: means to measure the outlet gas flow 7 at the outlet 6 of a regenerating vessel 4, means for determining the concentration 8 of a second gaseous component at the outlet 6 of said regenerating vessel 4, a processing unit for comparing the measured data with set values and for controlling the time interval in which the flow of gas is guided through the inlet 5 of said vessel 4, said controller being configured to be provided in a gas generator according to the present invention.

Example 1 for the pressure correction factor for capacity, Kpc, preferably interpolated according to the following table, but not limiting to:

|  | Kpc | |
| --- | --- | --- |
| pressure [bar] | For a first set value of concentration | For a second set value of concentration |
| 4 | 0.56 | 0.52 |
| 4.5 | 0.63 | 0.60 |
| 5 | 0.71 | 0.67 |
| 5.5 | 0.77 | 0.75 |
| 6 | 0.85 | 0.83 |
| 6.5 | 0.93 | 0.91 |
| 7 | 1.00 | 1.00 |
| 7.5 | 1.07 | 1.04 |
| 8 | 1.13 | 1.09 |
| 8.5 | 1.19 | 1.11 |
| 9 | 1.25 | 1.13 |
| 9.5 | 1.30 | 1.15 |
| 10 | 1.35 | 1.16 |
| 10.5 | 1.40 | 1.17 |
| 11 | 1.45 | 1.18 |
| 11.5 | 1.50 | 1.20 |
| 12 | 1.54 | 1.21 |
| 12.5 | 1.58 | 1.23 |
| 13 | 1.61 | 1.25 |

Whereby said first set value of concentration refers to said set value of concentration for the second gaseous component, which can be a value preferably selected between 95 and 99.5%.

Said second set value of concentration refers to said set value of concentration for the second gaseous component, which can be a value preferably selected between 99.5 and 99.999%.

Example 2 for the temperature correction factor for capacity, Ktc, preferably interpolated according to the following table, but not limiting to:

|  | Ktc | |
| --- | --- | --- |
| temp [° C.] | For a first set value of concentration | For a second set value of concentration |
| 5 | 1.00 | 1.02 |
| 10 | 1.00 | 1.02 |
| 15 | 1.00 | 1.00 |
| 20 | 1.00 | 1.00 |
| 25 | 0.98 | 0.96 |
| 30 | 0.95 | 0.93 |
| 35 | 0.92 | 0.88 |
| 40 | 0.88 | 0.83 |
| 45 | 0.83 | 0.78 |
| 50 | 0.78 | 0.72 |
| 55 | 0.72 | 0.67 |
| 60 | 0.66 | 0.62 |

Whereby said first set value of concentration refers to said set value of concentration for the second gaseous component, which can be a value preferably selected between 95 and 99.5%.

Said second set value of concentration refers to said set value of concentration for the second gaseous component, which can be a value preferably selected between 99.5 and 99.999%.

The present invention is by no means limited to the embodiments described as an example and shown in the drawings, but such a gas generator can be realized in all kinds of variants, without departing from the scope of the invention.

The invention claimed is:

1. A method for controlling an adsorption phase of a gas generator, said generator comprising at least one vessel comprising an inlet and an outlet for allowing a flow of gas therethrough and an adsorbent medium capable of selectively adsorbing a first gaseous component from a gaseous mixture, and allowing an outlet gas flow mainly comprising a second gaseous component, said method comprising the steps of:
   directing the inlet gas flow through an inlet of said vessel;
   measuring the volume of the second gaseous component per unit of time with a flow meter positioned at the outlet of said vessel;
   determining the concentration of said second gaseous component at the outlet of said vessel;
   wherein the method further comprises the steps of:
   calculating the capacity of the vessel, whereby the capacity is the maximum volume of the second gaseous component per unit of time that can be delivered at a current operating condition and at a set value of the concentration;
   comparing the measured volume of the second gaseous component with the calculated capacity;
   if the measured volume of the second gaseous component is lower than the calculated capacity, and if the determined concentration is higher than or equal to a set value, maintaining the vessel in adsorption phase for a predetermined time interval, $\Delta s$;
   subjecting the vessel to a regenerating cycle after said predetermined time interval, $\Delta s$.

2. The method according to claim 1, further comprising the step of comparing the determined concentration with a set value and if said concentration is below the set value, interrupting the inlet gas flow and subjecting the vessel to a regenerating cycle.

3. The method according to claim 2, further comprising the step of interrupting the inlet gas flow after a nominal predetermined cycle time, $\Delta s_0$.

4. The method according to claim 1, wherein the capacity of the generator is determined based on the following formula:

$Q\text{cap} = \text{Specific capacity} \times \text{Generator volume} \times Kpc \times Ktc$ whereby, Kpc is the pressure correction factor for capacity and Ktc is the temperature correction factor for capacity.

5. The method according to claim 1, wherein said method further comprises the step of comparing the amount of time that the vessel is in adsorption phase, $\Delta t1$, with a minimum set time interval, $\Delta t2$.

6. The method according to claim 5, wherein said method comprises one of the following steps:
   if $\Delta t1 > \Delta t2$ and if the measured outlet flow is lower than the calculated capacity and if the determined concentration is higher than or equal to said set value, then the vessel is maintained in adsorption phase for said predetermined time interval, $\Delta s$; or if $\Delta t_1 <= \Delta t_2$ or if the determined concentration is lower than said set value and if the measured outlet flow is lower than the calculated capacity, then the vessel is maintained in adsorption phase during the nominal predetermined cycle time, $\Delta s_0$, and afterwards is subjected to a regenerating cycle.

7. The method according to claim 1, wherein the first gaseous component is oxygen and the second gaseous component is nitrogen.

8. The method according to claim 1, further comprising directing the inlet gas flow through the inlet of at least one vessel, part of the generator.

9. The method according to claim 8, further comprising alternatively directing the inlet gas flow through the inlet of at least two vessels.

10. The method according to claim 9, further comprising directing the outlet gas flow from one vessel to the inlet of at least another vessel during the regeneration cycle.

11. The method according to claim 1, comparing the outlet flow with the calculated capacity and maintaining the inlet flow for a predetermined time interval if the outlet flow is higher than a first threshold when compared with the calculated capacity.

12. The method according to claim 11, wherein the method further comprises at least one of the following steps:
   maintaining the inlet gas flow for a predetermined nominal time interval, $\Delta s_0$, if the measured outlet flow is higher than a first threshold when compared with the calculated capacity; or
   maintaining the inlet gas flow for a predetermined first time interval, $\Delta s_1$, if the measured outlet flow is lower than said first threshold when compared with the calculated capacity.

13. The method according to claim 11, wherein the method further comprises at least one of the following steps:
   maintaining the inlet gas flow for a predetermined nominal time interval, $\Delta s_0$, if the measured outlet flow is higher than a first threshold when compared with the calculated capacity; or
   maintaining the inlet gas flow for a predetermined first time interval, $\Delta s_1$, if the measured outlet flow is lower than said first threshold when compared with the calculated capacity; or
   maintaining the inlet gas flow for a predetermined second time interval, $\Delta s_2$, if the measured outlet flow is lower than a second threshold when compared with the calculated capacity; or
   maintaining the inlet gas flow for a predetermined third time interval, $\Delta s_3$, if the measured outlet flow is lower than a third threshold when compared with the calculated capacity.

14. The method according to claim 11, wherein the method further comprises at least one of the following steps:
   maintaining the inlet gas flow for a predetermined nominal time interval, $\Delta p_0$, if the measured outlet flow is higher or equal to a first threshold when compared with the calculated capacity; or
   maintaining the inlet gas flow for a predetermined first time interval, $\Delta p_1$, if the measured outlet flow is lower than said first threshold when compared with the calculated capacity; or
   maintaining the inlet gas flow for a predetermined second time interval, $\Delta p_2$, if the measured outlet flow is lower than a second threshold when compared with the calculated capacity; or
   maintaining the inlet gas flow for a predetermined third time interval, $\Delta p_3$, if the measured outlet flow is lower than a third threshold when compared with the calculated capacity; or
   maintaining the inlet gas flow for a predetermined fourth time interval, $\Delta p_4$, interval if the measured outlet flow is lower than a fourth threshold when compared to the calculated capacity; or
   maintaining the inlet gas flow for a predetermined fifth time interval, $\Delta p_5$, if the measured outlet flow is lower than fifth threshold when compared to the calculated capacity; or
   maintaining the inlet gas flow for a predetermined sixth time interval, $\Delta p_6$, if the measured outlet flow is lower than a sixth threshold when compared to the calculated capacity; or
   maintaining the inlet gas flow for a predetermined seventh time interval, $\Delta p_7$, if the measured outlet flow is lower than a seventh threshold when compared to the calculated capacity; or
   maintaining the inlet gas flow for a predetermined eight time interval, $\Delta p_8$, if the measured outlet flow is lower than an eighth threshold when compared to the calculated capacity; or
   maintaining the inlet gas flow for a predetermined ninth time interval, $\Delta p_9$, if the measured outlet flow is lower than a ninth threshold when compared to the calculated capacity.

15. The method according to claim 12, wherein two or more of the time intervals are of a different length when compared to each other.

16. A gas generator comprising:
   at least one vessel, comprising: an inlet and an outlet for allowing a flow of gas therethrough and an adsorbent material capable of selectively adsorbing a first gaseous component form a gaseous mixture and allowing an outlet gas flow mainly comprising a second gaseous component to flow through said outlet;
   means for providing an inlet gas flow at the inlet of said vessel;
   wherein the device further comprises:
      a flow meter positioned at the outlet of the vessel for measuring the volume of the second gaseous component;
      means for determining the concentration of said second gaseous component, positioned at the outlet of the vessel;
      a controller unit connected to the flow meter and to the means for determining the concentration of said second gaseous component, said controller being configured to receive measured values of the volume of the second gaseous component and of the measured concentration;
      said controller unit further comprises a processing unit being provided with an algorithm configured to:
      calculate the capacity of the vessel, whereby the capacity is the maximum volume of the second gaseous component per unit of time that can be delivered at a current operating condition and at a set value of the concentration,
      compare the measured volume of the second gaseous component with the calculated capacity,
      compare the determined concentration of said second gaseous component with a set value, and:
   said controller unit being further programmed to maintain the inlet gas flow for a predetermined time interval, $\Delta s$, when said measured concentration is equal to or higher than a set value, and when said measured volume of the second gaseous component is lower than the calculated capacity, and to subject the vessel to a regenerating cycle after said predetermined time interval, $\Delta s$.

17. The gas generator according to claim 16, wherein the controller unit is further programmed to maintain the inlet gas flow at the inlet of the vessel for a predetermined nominal cycle time interval, $\Delta s_0$, and to stop the inlet gas flow after said predetermined nominal cycle time interval, $\Delta s_0$, when said measured concentration is lower than the set value.

18. The gas generator according to claim 17, wherein the controller unit is further programmed to apply a regenerating cycle to said vessel.

19. The gas generator according to claim 16, further comprising at least two vessels, each of said vessels comprising an inlet and an outlet for allowing a flow of gas therethough, and an adsorbent material capable of selectively adsorbing a first gaseous component form a gaseous mixture and allowing an outlet gas flow mainly comprising a second gaseous component to flow through said outlet.

20. A controller unit comprising: means to measure the volume of the second gaseous component at the outlet of a regenerating vessel, means for determining the concentration of a second gaseous component at the outlet of said regenerating vessel, a processing unit for comparing the measured data with set values and for controlling the time interval in which the flow of gas is guided through the inlet of said vessel, said controller being configured to be provided in a gas generator according to claim 16.

* * * * *